United States Patent
Hock et al.

(10) Patent No.: US 8,453,786 B2
(45) Date of Patent: Jun. 4, 2013

(54) FRONT SECTION FOR A MOTOR VEHICLE

(75) Inventors: Theobald Hock, Grossostheim (DE); Viet-Hung Nguyen, Wiesbaden (DE); Martin Leonhard Sachs, Rödermark (DE)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

(21) Appl. No.: 12/376,533

(22) PCT Filed: Jul. 27, 2007

(86) PCT No.: PCT/EP2007/006685
§ 371 (c)(1),
(2), (4) Date: May 28, 2010

(87) PCT Pub. No.: WO2008/017391
PCT Pub. Date: Feb. 14, 2008

(65) Prior Publication Data
US 2010/0230981 A1   Sep. 16, 2010

(30) Foreign Application Priority Data
Aug. 7, 2006 (DE) .......... 10 2006 036 852

(51) Int. Cl.
*B60R 19/02* (2006.01)
*B60R 19/12* (2006.01)
*B60R 19/04* (2006.01)

(52) U.S. Cl.
USPC .......... 180/311; 280/784; 293/102; 293/121; 293/146; 296/187.03

(58) Field of Classification Search
USPC ... 180/311, 312; 280/781, 782, 784; 293/102, 293/121, 146; 296/187.03, 203.01
See application file for complete search history.

(56) References Cited

U.S. PATENT DOCUMENTS

| 6,131,685 | A | 10/2000 | Sakamoto et al. |
| 6,435,577 | B1 * | 8/2002 | Renault ......................... 293/120 |
| 6,679,523 | B2 | 1/2004 | Yamamoto et al. |
| 7,008,007 | B2 * | 3/2006 | Makita et al. ............ 296/187.09 |
| 7,213,873 | B2 * | 5/2007 | Murata et al. .................. 296/204 |

(Continued)

FOREIGN PATENT DOCUMENTS

| CN | 101011955 A | 8/2007 |
| DE | 3522447 A1 | 7/1986 |

(Continued)

OTHER PUBLICATIONS

British Patent Office, British Search Report for British Application No. 0902055.3, Feb. 11, 2011.

(Continued)

*Primary Examiner* — Toan To
*Assistant Examiner* — Barry Gooden, Jr.
(74) *Attorney, Agent, or Firm* — Ingrassia Fisher & Lorenz, P.C.

(57) ABSTRACT

A front section for a motor vehicle body features a main frame that includes, but is not limited to an upper bumper carrier, a lower reinforcing element for the bumper that extends underneath the upper bumper carrier and a sub-frame that is elastically fixed on the main frame by means of a buffer. The buffer is held between an end piece of the reinforcing element and the main frame.

12 Claims, 2 Drawing Sheets

U.S. PATENT DOCUMENTS

| | | | |
|---|---|---|---|
| 7,517,006 B2 * | 4/2009 | Kageyama et al. | 296/187.09 |
| 2001/0026073 A1 * | 10/2001 | Sato et al. | 293/121 |
| 2005/0212334 A1 * | 9/2005 | Murata et al. | 296/204 |
| 2007/0182171 A1 * | 8/2007 | Kageyama et al. | 293/102 |

FOREIGN PATENT DOCUMENTS

| | | |
|---|---|---|
| DE | 19654571 A1 | 7/1997 |
| EP | 0926048 A2 | 6/1999 |
| EP | 1188643 A1 | 3/2002 |
| EP | 1580097 A2 | 9/2005 |
| EP | 1813485 A1 | 8/2007 |
| FR | 2863981 A1 | 6/2005 |
| JP | 2004203183 A | 7/2004 |

OTHER PUBLICATIONS

International Searching Authority, PCT Search Report for PCT Application No. PCT/EP2007/006685, Dec. 13, 2007.

German Patent Office, German Search Report for Application No. 102006036852.5, dated Oct. 7, 2008.

China Patent Office, Chinese Office Action for Application No. 200780037438.5, dated Nov. 10, 2011.

* cited by examiner

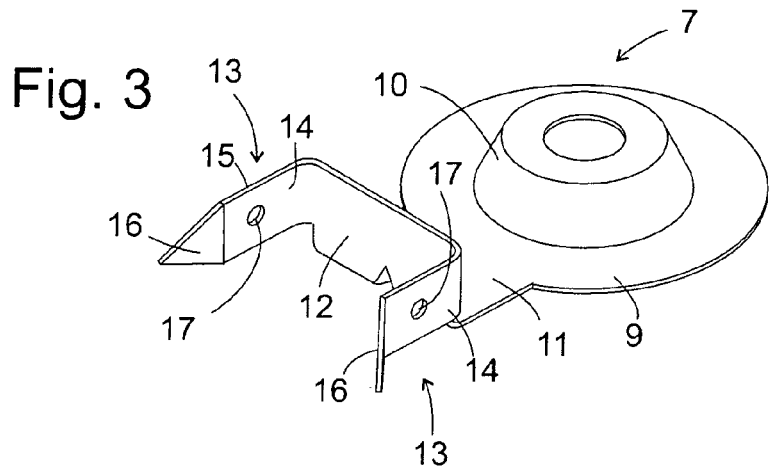
Fig. 3
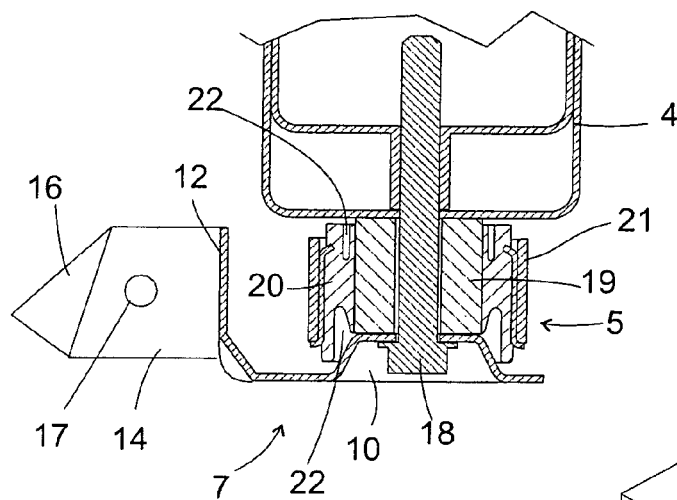
Fig. 4
Fig. 5

FRONT SECTION FOR A MOTOR VEHICLE

CROSS-REFERENCE TO RELATED APPLICATIONS

This application is a U.S. National-Stage entry under 35 U.S.C. §371 based on International Application No. PCT/EP2007/006685, filed Jul. 27, 2007, which was published under PCT Article 21(2) and claims priority to German Application No. 102006036852.5, filed Aug. 7, 2006, which are all hereby incorporated in their entirety by reference.

TECHNICAL FIELD

The present invention pertains to a front section for a motor vehicle body, in which an upper region of a bumper can be mounted on a bumper carrier that can be plastically deformed in case of a collision and a lower region of the bumper is reinforced by means of a reinforcing element that lies behind the bumper and is realized separately of the bumper carrier.

BACKGROUND

A few years ago, manufacturers began using reinforcing elements of this type in motor vehicle bodies in order to protect the legs of a pedestrian in case of a collision. In a collision between a pedestrian and a motor vehicle, on which the transverse bumper carrier is conventionally positioned at approximately the knee height of a pedestrian and the bumper is slightly flexible or non-existent underneath the bumper carrier, it is possible that the lower legs of the pedestrian are pulled underneath the vehicle while the torso impacts on the hood. This can lead to severe knee injuries of the pedestrian. A balanced reinforcement of the bumper below the knee assists in preventing the lower legs from being pulled underneath the vehicle such that the risk of injuries is reduced.

In order to fulfill its function, the lower reinforcing element needs to be connected to a main frame of the motor vehicle body that also carries or comprises the bumper carrier in a sufficiently rigid fashion. However, it was determined that it is difficult to produce this connection, in particular, on compact body constructions. For example, EP 1 188 643 A1 discloses a motor vehicle body with two longitudinal beams, on the front region of which a sub-frame is suspended that has an essentially quadrangular shape and carries the engine and the front axle of the motor vehicle. Although such a motor vehicle body makes it possible to mount the bumper carrier on the front ends of the longitudinal beams, the reinforcing element can only be mounted on the sub-frame that can vibrate relative to the longitudinal beams and therefore also relative to the bumper carrier due to its elastic suspension. In order to prevent that a reinforcing element mounted on the sub-frame deforms the bumper or impacts thereon while driving, it would be necessary to realize the clearance between the bumper and the reinforcing element in accordance with the freedom of motion of the sub-frame, but this measure would impair the stability of the bumper and also limit its effectiveness.

Consequently, the invention is based on at least one objective of disclosing a front section for a motor vehicle body, in which a mounting of the reinforcing element has a minimal space requirement and the reinforcing element can be fixed in an at least essentially vibration-free fashion referred to the main frame. In addition, other objectives, desirable features and characteristics will become apparent from the subsequent summary and detailed description, and the appended claims, taken in conjunction with the accompanying drawings and this background.

SUMMARY

In a front section for a motor vehicle body with a rigid main frame that comprises an upper bumper carrier, a lower reinforcing element for the bumper that extends underneath the upper bumper carrier and a sub-frame that is elastically fixed on the main frame by means of a buffer, the at least one objective is attained in that the buffer is held between an end piece of the reinforcing element and the main frame.

According to one preferred embodiment, the buffer comprises a rigid inner body that is fixed on the end piece of the reinforcing element and the main frame and an outer elastic layer that encases the inner body and on which the sub-frame engages. In this embodiment, the sub-frame can vibrate relative to the main frame without transmitting this vibration to the reinforcing element.

According to an alternative embodiment, the inner body of the buffer could be replaced with a projection of the reinforcing element and/or the main frame that is encased by the outer elastic layer. It would also be possible to consider intermediate solutions, in which a projection of the main frame or of the end piece of the reinforcing element engages into a cavity that is surrounded by the outer elastic layer in order to contact a face of the rigid inner body.

The inner body is preferably clamped between the end piece of the reinforcing element and the main frame.

This clamping can be easily realized with the aid of a screw that extends through the rigid inner body and is held on the end piece on one side and on the main frame on the other side.

The end piece is preferably provided with a flange that limits the deformation of the elastic layer so as to prevent an excessive deformation that could damage the material of the elastic layer.

In order to simplify the assembly of the front section and to compensate dimensional tolerances of the bumper, the bumper carrier and/or the reinforcing element, the end pieces are preferably mounted on the reinforcing element such that they can be adjusted in the longitudinal direction of the vehicle.

For this purpose, the end pieces are preferably mounted on the reinforcing element with the aid of pins that extend through holes of the reinforcing element and the end pieces, and at least one of these holes is an oblong hole.

In order to further simplify the assembly, at least one of the components, namely the end piece or the reinforcing element, features an indentation that is provided with an insertion cone and serves for accommodating one end of the other component.

The end piece may be advantageously made of sheet metal. This would make it possible, among other things, to realize the indentation by simply bending two lugs of a base plate at an angle.

These lugs preferably feature two essentially parallel wall sections that face one another and two divergent wall sections that lie in front of the parallel wall sections referred to the longitudinal direction of the vehicle and form the insertion cone.

The reinforcing element preferably consists of a one-piece plastic element.

BRIEF DESCRIPTION OF THE DRAWINGS

The present invention will hereinafter be described in conjunction with the following drawing figures, wherein like numerals denote like elements, and:

FIG. 3 shows an enlarged representation of an end piece or adapter of the reinforcing element according to FIG. 1;

FIG. 4 shows a schematic section through the mounted adapter and its surroundings; and FIG. 5 shows a perspective representation of a head section of the reinforcing element that is intended for being mounted on the adapter.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
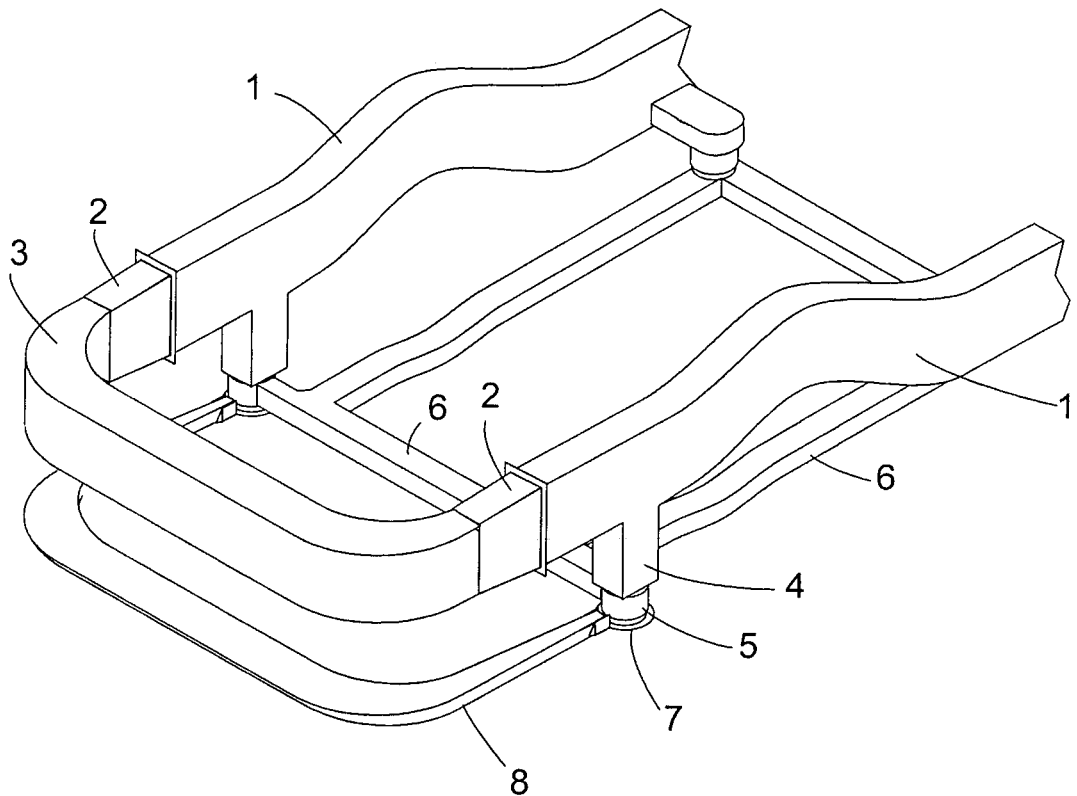
FIG. 1 shows a schematic perspective representation of parts of the front section of a motor vehicle body according to an embodiment of the present invention.
Figure 2:
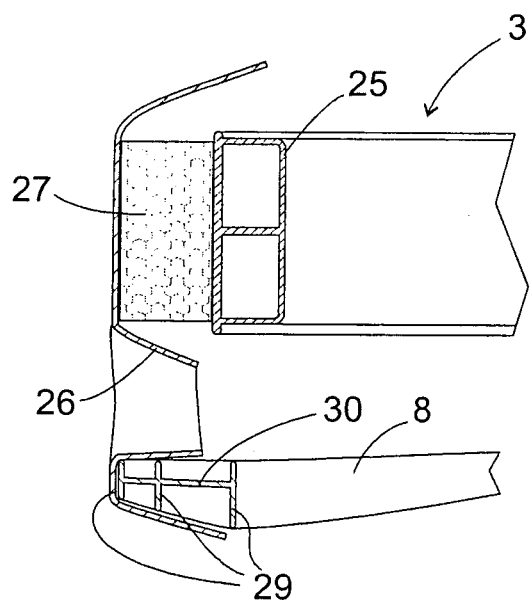
FIG. 2 shows a schematic section through the front section with a bumper mounted thereon.

FIG. 1 schematically shows the front regions of two longitudinal beams 1 that are rigidly connected to one another in a not-shown rear body region at the height of the motor vehicle passenger compartment. A bumper carrier 3 is mounted on the front ends of the longitudinal beams 1 by means of crash boxes 2 that are intended to collapse in the longitudinal direction during a collision. According to the sectional representation in FIG. 2, the bumper carrier 3 comprises a bracket 25 that extends between the crash boxes 2 and is realized in the form of a metallic hollow profile in its rear region referred to the longitudinal direction of the vehicle, as well as an energy absorbing body 27 that engages into a recess of the plastic bumper 26 manufactured by means of deep-drawing, for example, and consists of a material that can be plastically compressed such as+a rigid foam in its front region, for example.

Two downwardly directed legs 4 that are fixed on the longitudinal beams 1 in the vicinity of their front ends hold the front region of a sub-frame 6 of approximately quadrangular shape by means of buffers 5 that are described in greater detail below, and a not-shown engine and a front axle of the vehicle that is driven by the engine are conventionally fixed on said sub-frame. One respective adapter 7 is arranged underneath the buffers 5, wherein one of two head pieces of a reinforcing element 8 that is curved in an arc-shaped fashion is mounted on said adapter.

FIG. 3 shows a perspective representation of the adapter 7. The adapter 7 in the form of a sheet metal blank comprises a circular flange 9, the center of which contains a projection 10 in the form of a truncated cone. A lug 11 radially protrudes from the edge of the projection 10 and is bent at a right angle so as to form a rear wall 12 of a receptacle recess for a head piece of the reinforcing element 8. Two tabs 13 that are angled forward from the rear wall 12, respectively, comprise sections 14 with an about horizontally extending upper edge 15 that directly adjoin the rear wall 12 and lie opposite of one another in a parallel fashion, as well as divergent sections 16 that form an insertion cone for simplifying the insertion of a head piece of the reinforcing element 8 during the assembly. Holes 17 are provided in the sections 14 in order to fix a head piece of the reinforcing element 8 on the adapter 7 with the aid of (not-shown) screws or bolts inserted into these holes.

FIG. 4 shows a schematic section through one of the adapters 7, one of the buffers 5 and one of the legs 4, on which the buffer 5 and the adapter 7 are mounted. This mounting is realized with a screw 18, the head of which is accommodated in the hollow projection 10 of the adapter 7 and the shaft of which extends through a bore of the buffer 5 and is engaged with a thread in the interior of the leg 4. The buffer 5 has a hollow-cylindrical core 19 that essentially cannot be deformed and is clamped between the projection 10 of the adapter 7 and the underside of the leg 4 by the screw 18, as well as a casing 20 of an elastic rubber material that surrounds the core 19. A ring 21 that is rigidly connected to the sub-frame 6 surrounds the elastic casing 20 and his fixed thereon. The elasticity of the material of the casing 20, as well as its cross-sectional shape with circumferential grooves 22, ensures a mobility of the sub-frame 6 relative to the longitudinal beams 1 on the order of a few millimeters. Since the adapter 7 is supported on the non-deformable core 19 of the buffer 5, it does not follow the motion of the sub-frame 6; instead, its flange 9 rather serves as a limit stop that limits the freedom of motion of the sub-frame 6 in the vertical direction.

FIG. 5 shows a perspective representation of one of the two head pieces 23 of the reinforcing element 8. The head piece 23 essentially has the shape of a hollow cylinder, the inner cavity of which is stretched into an oblong hole 24 in the longitudinal direction of the vehicle. If the reinforcing element 8 is correctly positioned on the motor vehicle body such that the head pieces 23 engage between the sections 14 of the tabs 13, the oblong holes 24 are respectively aligned with the holes 17 of the adjacent sections 14 such that the reinforcing element 8 can be fixed with the aid of screws extending through the holes 17 and the oblong holes 24. The oblong holes 24 make it possible to adjust the reinforcing element 8 in the longitudinal direction of the vehicle before the screws are tightened and the head pieces 23 are clamped between the sections 14 of the adapters 7 in order to compensate dimensional tolerances of the bumper carrier 3, the reinforcing element 8 or the bumper 26 held by these two components.

The two head pieces 23 are integrally connected by a bent bracket 28 that forms the bulk of the reinforcing element 8 and essentially extends in the longitudinal direction of the vehicle in the vicinity of the head pieces 23. This bracket 28 is illustrated in a sectioned fashion in FIG. 4 in order to elucidate its cross-sectional shape. This cross section shows three parallel walls 29 that are essentially oriented vertically, and the two outer walls are respectively aligned with a face of the head piece 23, and wherein said parallel walls are connected to one another by a wall 30 that is essentially oriented horizontally.

Two lugs 31 protrude in opposite directions from the two faces of the head piece 23, namely on the upper edge. These lugs are provided in order to contact the upper edges 15 of the tabs 13 of the adapter 7 during the installation of the reinforcing element 8 and to thusly guide the head piece 23 to the correct height, at which the oblong hole 24 is aligned with the holes 17, as the head piece approaches the rear wall 12 of the adapter 7. The insertion cone formed by the divergent sections 16 ensures that the head pieces 23 of the reinforcing element 8 quickly and reliably reach the intended installation position between the sections 14, namely also if the reinforcing element is inaccurately positioned referred to the transverse direction of the vehicle, and the lugs 31 also ensure an automatic positioning of the head piece 23 in the vertical direction in cooperation with the sloping of the upper edge 15 in at least a region of the tabs 13 that faces away from the rear wall 12.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A front section for a motor vehicle body with a main frame, comprising:
   an upper bumper carrier;
   a lower reinforcing element for a bumper that extends underneath the upper bumper carrier; and
   a sub-frame that is elastically fixed on the main frame with a buffer, wherein the buffer is held between an end piece of the reinforcing element and the main frame, wherein the end piece is mounted on the reinforcing element that provides adjustment in a longitudinal direction of the motor vehicle body.

2. The front section according to claim 1, wherein the end piece are mounted on the reinforcing element with an aid of a pin that extend through a hole of the reinforcing element and of the end piece, wherein the hole is an oblong hole.

3. The front section according to claim 1, wherein the reinforcing element consists of a one-piece plastic element.

4. The front section according to claim 1, wherein the sub-frame carries at least one of a front axle or an engine.

5. The front section according to claim 1, wherein the buffer comprises:
   a rigid inner body that is fixed on the end piece of the reinforcing element and the main frame; and
   an outer elastic layer that encases the rigid inner body on which the sub-frame engages.

6. The front section according to claim 5, wherein the rigid inner body is clamped between the end piece of the reinforcing element and the main frame.

7. The front section according to claim 5, wherein the end piece comprises a flange that limits a deformation of the outer elastic layer.

8. The front section according to claim 5, wherein the end piece is held on the main frame by with a screw that extends through the rigid inner body.

9. The front section according to claim 1, wherein at least one of the end piece or the reinforcing element comprises an indentation that is provided with an insertion cone and serves for accommodating one end of the other component.

10. The front section according to claim 9, wherein the indentation is realized on the end piece of sheet metal by bending two tabs of a base plate at an angle.

11. The front section according to claim 10, wherein the two tabs comprise two essentially parallel wall sections that face one another and two divergent wall sections that lie in front of the parallel wall sections referred to the longitudinal direction of the vehicle and form the insertion cone.

12. The front section according to claim 10, wherein the two tabs comprise forwardly sloped upper edges, and in that the reinforcing element comprises lugs that are supported on the upper edges.

* * * * *